US012520177B2

(12) United States Patent
Sharma et al.

(10) Patent No.: US 12,520,177 B2
(45) Date of Patent: Jan. 6, 2026

(54) GEOGRAPHY BASED-KPI ANALYSIS OF A WIRELESS NETWORK

(71) Applicant: Rakuten Symphony, Inc., Tokyo (JP)

(72) Inventors: Keshav Sharma, Indore (IN); Kundan Kaushik, Indore (IN); Aditya Budholiya, Indore (IN); Nilesh Bankar, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 387 days.

(21) Appl. No.: 18/023,106

(22) PCT Filed: Jan. 25, 2023

(86) PCT No.: PCT/US2023/011505
§ 371 (c)(1),
(2) Date: Feb. 24, 2023

(87) PCT Pub. No.: WO2024/129140
PCT Pub. Date: Jun. 20, 2024

(65) Prior Publication Data
US 2024/0357388 A1    Oct. 24, 2024

(30) Foreign Application Priority Data
Dec. 14, 2022 (IN) .............................. 202221072161

(51) Int. Cl.
*H04W 24/08*    (2009.01)
(52) U.S. Cl.
CPC .................................. *H04W 24/08* (2013.01)

(58) Field of Classification Search
CPC ...... H04W 24/08; H04W 24/04; H04W 24/02
See application file for complete search history.

(56) References Cited

U.S. PATENT DOCUMENTS

2015/0319048 A1*  11/2015  Griff ................... G06F 3/04842
                                                           715/736
2021/0051503 A1*   2/2021  Bodiga ......... H04W 36/008375
(Continued)

OTHER PUBLICATIONS

International Search Report dated May 10, 2023 in International Application No. PCT/US22/54110.
(Continued)

*Primary Examiner* — Michael A Keller
(74) *Attorney, Agent, or Firm* — Sughrue Mion, PLLC

(57) ABSTRACT

Embodiments herein disclose a method and a geography based KPI analysis system for determining geography based KPI of a wireless network. The method includes receiving, by the geography based-KPI analysis system, a data point input comprising latitude and longitude information for which a geography based-KPI analysis report need to be generated. The method further includes determining the geography of the wireless network based on the latitude and longitude information. The method further includes for each KPI of the plurality of KPIs supported by the geography based-KPI analysis system for the geography, iteratively determining a KPI value based on the geography based-KPI color range and the geography image metadata. The method further includes generating the geography based-KPI analysis report comprising the KPI value for each KPI of the plurality of KPIs supported by the geography based-KPI analysis system for the geography.

18 Claims, 9 Drawing Sheets

(56) References Cited

U.S. PATENT DOCUMENTS

2021/0201013 A1* 7/2021 Makhija ............... G06V 30/414
2022/0329524 A1 10/2022 Sinha et al.

OTHER PUBLICATIONS

Written Opinion dated May 10, 2023 in International Application No. PCT/US22/54110.

* cited by examiner

GEOGRAPHY BASED-KPI ANALYSIS OF A WIRELESS NETWORK

CROSS REFERENCE TO RELATED APPLICATION

The present application claims priority to Indian provisional application 202221072161 filed on Dec. 14, 2022, the contents of which is hereby expressly incorporated by reference, in its entirety, into the present application.

FIELD OF INVENTION

The embodiments herein relate to a wireless communication and more particularly relate to a method and the geography based-KPI analysis system for determining KPIs at various geography in a wireless network.

BACKGROUND OF THE INVENTION

Generally, considerable increase in number of users and demand for high bandwidth requires measuring performance of wireless network at more than one location for analyzes. The performance of the wireless network is measured based on a performance metric, such as a plurality of Key Performance Indicators (KPIs) at more than one location.

The conventional systems and methods for determining the performance of the wireless network for analysis by enabling multiple KPIs layers for plurality of KPIs. However, enabling the multiple KPIs layers for the plurality of KPIs is a time-consuming process. Further, when an operator wants to check value of KPIs again then the multiple KPIs layers need to be enabled again which consumes time for processing. Further, the conventional systems and methods, does not determine the plurality of KPIs at more than one location at a time.

Hence, there is a high demand for determining the performance of the wireless network for analysis at more than one location at a time without enabling multiple time KPIs layers.

OBJECT OF INVENTION

The principal object of the embodiments herein is to provide a method and geography based-KPI analysis system for geography based-KPI analysis of a wireless network which reduces time in analyzing multiple KPIs in multiple locations.

Another object of the embodiments herein is to iteratively determine a KPI value based on a geography based-KPI color range and a geography image metadata for each KPI of plurality of KPIs supported by the geography based-KPI analysis system for a geography which increases efficiency and processing speed.

Another object of the embodiments herein is to generate the geography based-KPI analysis report comprising the KPI value for each KPI of the plurality of KPIs supported by the geography based-KPI analysis system for the geography which does not require enabling multiple time KPIs layers.

SUMMARY

Accordingly, the embodiments herein disclose a geography based-KPI analysis system for determining a geography based KPI of a wireless network. The geography based-KPI analysis system comprises a KPI database that stores a KPI configuration comprising: a plurality of KPIs supported by the geography based-KPI analysis system, a geography based-KPI color range, available in each geography image of a plurality data geography images stored in a geography image database, for each KPI of the plurality of KPI and a geography image metadata representing at least one of date and time of the geography image. Further geography based-KPI analysis system includes a processor connected to the KPI database. The processor is configured to receive a data point input comprising latitude and longitude information of for which a geography based-KPI analysis report need to be generated. Further, the processor is configured to determine the geography of the wireless network based on the latitude and longitude information.

In an embodiment, the processor is configured to retrieve a geography image of the geography from the geography image database. Further, the processor is configured to iteratively determine a KPI value for each KPI of the plurality of KPIs supported by the geography based-KPI analysis system for the geography based the geography based-KPI color range available in the retrieved geography image and the geography image metadata of the retrieved geography image. Further, the processor is configured to generate the geography based-KPI analysis report comprising the KPI value for each KPI of the plurality of KPIs supported by the geography based-KPI analysis system for the geography. Further, the processor is configured to store the geography based-KPI analysis report for the geography in a geography based-KPI analysis report storage.

In an embodiment, the geography based-KPI analysis system determines a tile identifier based on the latitude and longitude information and for each KPI of the plurality of KPIs supported by the geography based-KPI analysis system, retrieve the geography image from a plurality of geography images of the determined geography stored in the geography image database based on the image identifier and the geography image metadata. The geography based-KPI analysis system for each KPI of the plurality of KPIs supported by the geography based-KPI analysis system, detect color provided in the retrieved geography image at the latitude and longitude information. The geography based-KPI analysis system for each KPI of the plurality of KPIs supported by the geography based-KPI analysis system, determine a color code corresponding to the detected color in the retrieved geography image based on the geography based-KPI color range. The geography based-KPI analysis system for each KPI of the plurality of KPIs supported by the geography based-KPI analysis system, determine the KPI value corresponding to the color code in the retrieved geography image.

Accordingly, the embodiments herein disclose a method for determining geography based KPI of the wireless network by the geography based KPI analysis system. The method includes storing, by the geography based KPI analysis system, the plurality of KPIs supported by the geography based-KPI analysis system and the geography based-KPI color range, available in each geography image of the plurality of data geography images stored in the geography image database, for each KPI of the plurality of KPI, and the geography image metadata representing at least one of date and time of the geography image. The method further includes receiving, by the geography based KPI analysis system, the data point input comprising latitude and longitude information for which the geography based-KPI analysis report needs to be generated. The method further includes determining, by the geography based KPI analysis system, the geography of the wireless network based on the latitude and longitude information. The method further includes retrieving, by the geography based KPI analysis system, the geography image of the geography from the geography image database.

In an embodiment, the method includes iteratively determining, by the geography based KPI analysis system, the KPI value for each KPI of the plurality of KPIs supported by the geography based-KPI analysis system for the geography based on the geography based-KPI color range available in the retrieved geography image, and the geography image metadata of the retrieved geography image. The method further includes generating, by the geography based KPI analysis system, the geography based-KPI analysis report comprising the KPI value for each KPI of the plurality of KPIs supported by the geography based-KPI analysis system for the geography. The method further includes storing, by the geography based KPI analysis system, the geography based-KPI analysis report for the geography in the geography based-KPI analysis report storage.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1A:
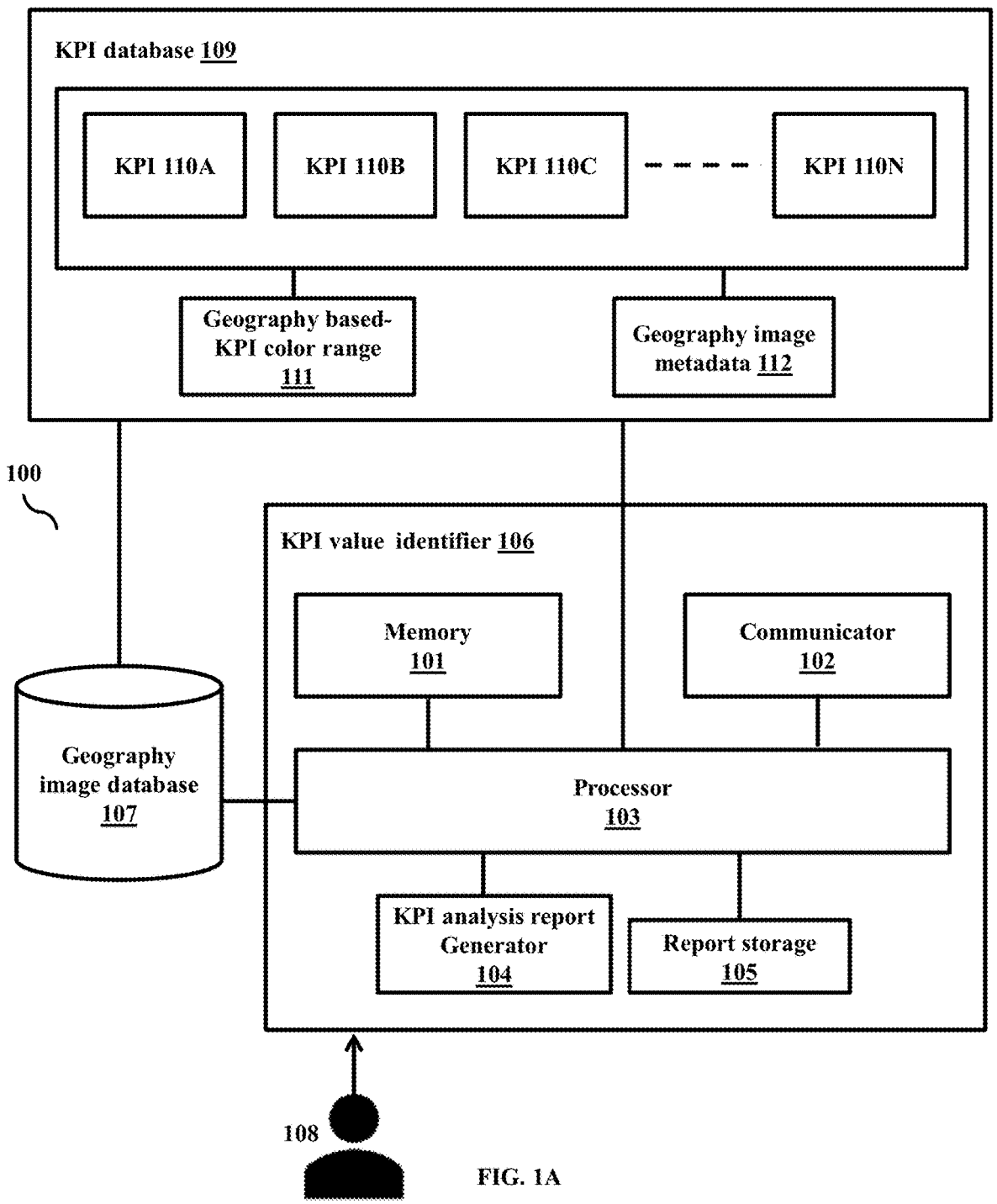
FIG. 1A is a block diagram of a geography based-KPI analysis system for determining KPIs at various geography in a wireless network, according to the embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be constructed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein disclose a geography based-KPI analysis system for determining geography based KPI of a wireless network. The geography based-KPI analysis system comprises a KPI database that stores a KPI configuration comprising: a plurality of KPIs supported by the geography based-KPI analysis system, a geography based-KPI color range, available in each geography image of a plurality data geography images stored in a geography image database, for each KPI of the plurality of KPI and a geography image metadata representing at least one of date and time of the geography image. Further geography based-KPI analysis system includes a processor connected to the KPI database. where the processor is configured to receive a data point input comprising latitude and longitude information of for which a geography based-KPI analysis report need to be generated. Further, the processor is configured to determine the geography of the wireless network based on the latitude and longitude information. Further, the processor is configured to retrieve a geography image of the geography from the geography image database. Further, the processor is configured to iteratively determine a KPI value for each KPI of the plurality of KPIs supported by the geography based-KPI analysis system for the geography based the geography based-KPI color range available in the retrieved geography image, and the geography image metadata of the retrieved geography image. Further, the processor is configured to generate the geography based-KPI analysis report comprising the KPI value for each KPI of the plurality of KPIs supported by the geography based-KPI analysis system for the geography. Further, the processor is configured to store the geography based-KPI analysis report for the geography in a geography based-KPI analysis report storage.

Accordingly, the embodiments herein disclose a method for determining geography based KPI of the wireless network by the geography based KPI analysis system. The method includes storing, by the geography based KPI analysis system, the plurality of KPIs supported by the geography based-KPI analysis system and the geography based-KPI color range, available in each geography image of the plurality of data geography images stored in the geography image database, for each KPI of the plurality of KPI, and the geography image metadata representing at least one of date and time of the geography image. The method further includes receiving, by the geography based KPI analysis system, the data point input comprising latitude and longitude information of for which the geography based-KPI analysis report need to be generated. The method further includes determining, by the geography based KPI analysis system, the geography of the wireless network based on the latitude and the longitude information. The method further includes retrieving, by the geography based KPI analysis system, the geography image of the geography from the geography image database. The method further includes iteratively determining, by the geography based KPI analysis system, the KPI value for each KPI of the plurality of KPIs supported by the geography based-KPI analysis system for the geography based on the geography based-KPI color range available in the retrieved geography image, and the geography image metadata of the retrieved geography image. The method further includes generating, by the geography based KPI analysis system, the geography based-KPI analysis report comprising the KPI value for each KPI of the plurality of KPIs supported by the geography based-KPI analysis system for the geography. The method further includes storing, by the geography based KPI analysis system, the geography based-KPI analysis report for the geography in the geography based-KPI analysis report storage.

The conventional systems and methods determines the performance of the wireless network for analysis by enabling multiple KPIs layers for the plurality of KPIs. However, enabling the multiple KPIs layers for the plurality of KPIs is a time-consuming process. Further, when an operator wants to check the value of KPIs again then the multiple KPIs layers need to be enabled again which consumes time for processing. Further, the conventional systems and methods, do not determine the plurality of KPIs at more than one location at a time.

Unlike conventional systems, the proposed system and method increases efficiency and processing speed by iteratively determining a KPI value based on a geography based-KPI color range.

Unlike conventional systems, the proposed system and method generates the geography based-KPI analysis report comprising the KPI value for each KPI of the plurality of KPIs without the need of enabling multiple time KPIs layers.

Referring now to the drawings, and more particularly to FIG. 1A through FIG. 8, there are shown preferred embodiments.

FIG. 1A is a block diagram of a geography based-KPI analysis system (100) for determining KPIs at various geography in a wireless network, according to the embodiments as disclosed herein.

Referring to FIG. 1, examples of the geography based-KPI analysis system (100) include but are not limited to a laptop, a palmtop, a desktop, a mobile phone, a smartphone, Personal Digital Assistant (PDA), a tablet, a wearable device, an Internet of Things (IOT) device, a virtual reality device, a foldable device, a flexible device, an immersive system, etc.

In an embodiment, the geography based-KPI analysis system (100) includes a KPI database (109), a geography image database (107), and a KPI value identifier. The KPI value identifier includes a memory (101), a processor (103) a communicator (102), a KPI analysis report generator (104), and a report storage (105).

The memory (101) stores instructions to be executed by the processor (103) for determining KPIs at various geography in the wireless network. The memory (101) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (101) may, in some examples, be considered a non-transitory storage medium. The term "non-transitory" may indicate that the storage medium is not embodied in a carrier wave or a propagated signal. However, the term "non-transitory" should not be interpreted that the memory (101) is non-movable. In some examples, the memory (101) can be configured to store larger amounts of information than its storage space. In certain examples, a non-transitory storage medium may store data that can, over time, change (e.g., in Random Access Memory (RAM) or cache). The memory (101) can be an internal storage unit or it can be an external storage unit of the electronic device (100), a cloud storage, or any other type of external storage.

The processor (103) is configured to execute instructions stored in the memory (101). The processor (103) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (103) may include multiple cores to execute the instructions.

The communicator (102) is configured for communicating internally between hardware components in the geography based-KPI analysis system (100). Further, the communicator (102) is configured to facilitate communication between the geography based-KPI analysis system (100) and other devices via one or more networks (e.g. Radio technology). The communicator (102) includes an electronic circuit specific to a standard that enables wired or wireless communication.

The processor (103) is coupled with the KPI value identifier and the KPI value identifier is implemented by processing circuitry such as logic gates, integrated circuits, microprocessors, microcontrollers, memory (101) circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

In an embodiment, the geography based-KPI analysis system (100) includes the KPI database (109) that stores a KPI configuration comprising: a plurality of KPIs (110A-110N) supported by the geography based-KPI analysis system (100), a geography based-KPI color range (111), available in each geography image of a plurality data geography images stored in a geography image database (107), for each KPI of the plurality of KPI and a geography image metadata (112) representing at least one of date and time of the geography image. Further geography based-KPI analysis system (100) includes a processor (103) connected to the KPI database (109) and the processor (103) is configured to receive a data point input from a user (108) (108) comprising latitude and longitude information for which a geography based-KPI analysis report need to be generated. Further, the processor (103) is configured to determine the geography of the wireless network based on the latitude and longitude information. Further, the processor (103) is configured to retrieve a geography image of the geography from the geography image database (107). Further, the processor (103) is configured to iteratively determine a KPI value for each KPI of the plurality of KPIs (110A-110N) supported by the geography based-KPI analysis system (100) for the geography based the geography based-KPI color range (111) available in the retrieved geography image, and the geography image metadata (112) of the retrieved geography image. The KPI analysis report generator (104) generates the geography based-KPI analysis report comprising the KPI value for each KPI of the plurality of KPIs (110A-110N) supported by the geography based-KPI analysis system (100) for the geography. The report storage (105) stores the geography based-KPI analysis report for the geography in a geography based-KPI analysis report storage (105).

The processor (103) is configured to determine a tile identifier based on the latitude and longitude information and for each KPI of the plurality of KPIs (110A-110N) supported by the geography based-KPI analysis system (100), retrieve the geography image from a plurality of geography images (110AA-110NN) of the determined geography stored in the geography image database (107) based on the image identifier and the geography image metadata (112). The processor (103) is further configured to detect color provided in the retrieved geography image at the latitude and longitude information for each KPI of the plurality of KPIs (110A-110N) supported by the geography based-KPI analysis system (100). The processor (103) is further configured to determine a color code corresponding to the detected color in the retrieved geography image based on the geography based-KPI color range (111) for each KPI of the plurality of KPIs (110A-110N) supported by the geography based-KPI analysis system (100). The processor (103) is further configured to determine the KPI value corresponding to the color code in the retrieved geography image for each KPI of the plurality of KPIs (110A-110N) supported by the geography based-KPI analysis system (100).

The processor (103) is configured to determine whether the KPI is a Best Server Plot (BSP) KPI for each KPI of the plurality of KPIs (110A-110N) supported by the geography based-KPI analysis system (100). The processor (103) is further configured to determine the KPI value corresponding to the BSP color code in the retrieved geography image when the KPI is the BSP KPI, determine a BSP color code corresponding to the color code in the retrieved geography image and determine the KPI value corresponding to the color code in the retrieved geography image when the KPI is not the BSP KPI.

The processor (103) is configured to segment the retrieved image into a plurality of pixels and retrieve a set of pixels from the plurality of pixels at the latitude and longitude information. The processor (103) is further configured to determine the geography based-KPI color range (111) based on the set of pixels and detect the color at the latitude and longitude information based on the geography based-KPI color range (111).

In an embodiment, the geography image database (107) stores the plurality of geography images (110AA-110NN) of the determined geography using the same tile identifier, and where each geography image of the plurality of geography images (110AA-110NN) is associated with respective KPI of the plurality of KPIs (110A-110N) supported by the geography based-KPI analysis system (100), and where the each geography image of the plurality of geography images (110AA-110NN) comprises color regions representing the KPI value of the respective KPI of the plurality of KPIs (110A-110N) supported by the geography based-KPI analysis system (100).

In an embodiment, the geography images of the determined geography stored in the geography image database (107) are iteratively retrieved based on the same tile identifier for respective KPI of the plurality of KPIs (110A-110N).

The processor (103) is configured to retrieve the system configuration from the KPI database (109) and determine a KPI count based on information about the plurality of KPIs (110A-110N), supported by the geography based-KPI analysis system (100), provided in the system configuration. The processor (103) is further configured to generate a data frame based on the plurality of KPIs (110A-110N) supported by the geography based-KPI analysis system (100), the geography based-KPI color range (111) in the geography image of the determined geography, the KPI count, and the geography image metadata (112) representing at least one of date and time of the geography image. The processor (103) is further configured to determine whether the KPI value for each KPI of the plurality of KPIs (110A-110N) are received based on the KPI count. The processor (103) is further configured to generate the geography based-KPI analysis report by appending the KPI value for each KPI of the plurality of KPIs (110A-110N) to the data frame when the KPI value for each KPI of the plurality of KPIs (110A-110N) are received based on the KPI count.

The processor (103) is configured to display a user interface to upload a data point file to the geography based-KPI analysis system (100), where the data point file comprises the latitude and longitude information of the determined geography for which the geography based-KPI analysis report need to be generated. The processor (103) is further configured to receive the data point file uploaded to the geography based-KPI analysis system (100) as the data point input. The processor (103) is further configured to extract the extract the latitude and longitude information of the determined geography for which the geography based-KPI analysis report need to be generated from the uploaded datapoint file.

The processor (103) is configured to display a geographic map to a user (108) and detect the data point input from the user (108) on the geographic map, where the data point input corresponds to the latitude and longitude information of the determined geography for which the geography based-KPI analysis report need to be generated.

Figure 1B:
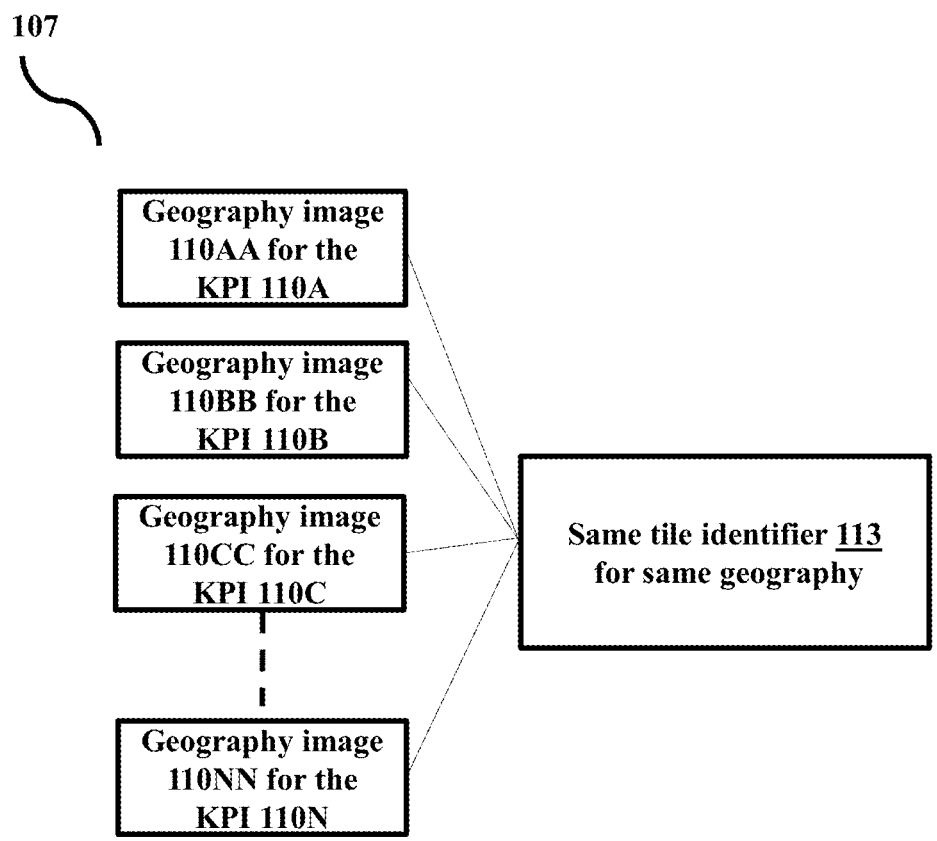
FIG. 1B is a schematic diagram illustrating a plurality of geography images of the determined geography using the same tile identifier, according to the embodiments as disclosed herein.

FIG. 1B is a schematic diagram illustrating plurality of geography images (110AA-110NN) of the determined geography using the same tile identifier, according to the embodiments as disclosed herein.

In an embodiment, the geography image database (107) stores the plurality of geography images (110AA-110NN) of the determined geography using the same tile identifier. The each geography image of the plurality of geography images (110AA-110NN) is associated with the respective KPI of the plurality of KPIs (110A-110N) supported by the geography based-KPI analysis system (100). The each geography image of the plurality of geography images (110AA-110NN) comprises color regions representing the KPI value of the respective KPI of the plurality of KPIs (110A-110N) supported by the geography based-KPI analysis system (100).

In an embodiment, the geography images of the determined geography stored in the geography image database (107) is iteratively retrieved based on the same tile identifier for the respective KPI of the plurality of KPIs (110A-110N).

Figure 2:
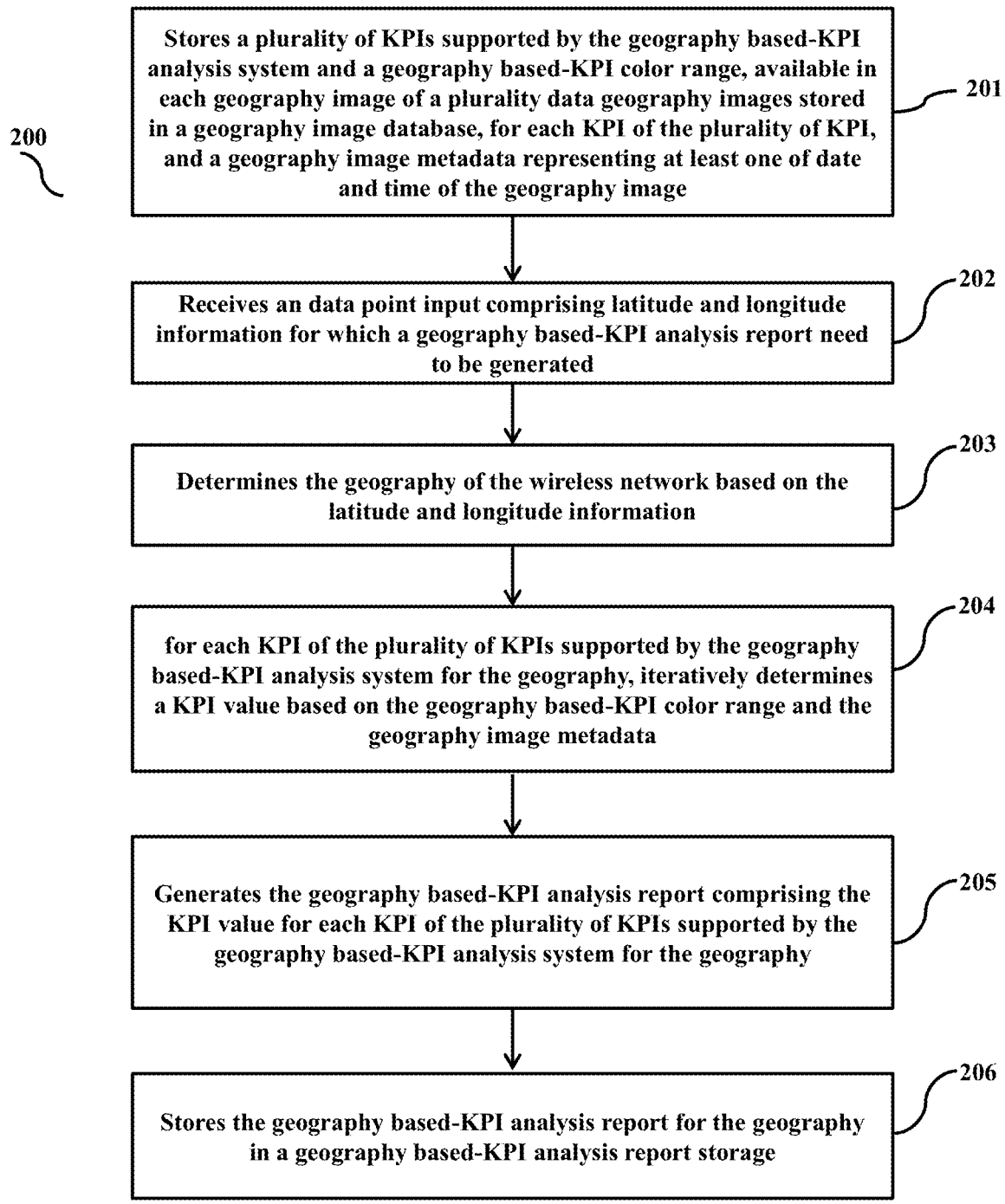
FIG. 2 is a flow chart illustrating a method for determining KPI value for each KPI of a plurality of KPIs at the various geography in the wireless network, according to the embodiments as disclosed herein.

FIG. 2 is a flow chart (200) illustrating a method for determining KPI value for each KPI of the plurality of KPIs (110A-110N) at various geography in the wireless network, according to the embodiments as disclosed herein.

At step 201, the geography based-KPI analysis system (100) stores the plurality of KPIs (110A-110N) supported by the geography based-KPI analysis system (100) and the geography based-KPI color range (111), available in each geography image of the plurality data geography images stored in the geography image database (107), for each KPI of the plurality of KPI, and the geography image metadata (112) representing at least one of date and time of the geography image.

At step 202, the geography based-KPI analysis system (100) receives the data point input comprising latitude and longitude information for which the geography based-KPI analysis report need to be generated.

At step 203, the geography based-KPI analysis system (100) determines the geography of the wireless network based on the latitude and longitude information.

At step 204, the geography based-KPI analysis system (100) for each KPI of the plurality of KPIs (110A-110N) supported by the geography based-KPI analysis system (100) for the geography, iteratively determines the KPI value based on the geography based-KPI color range (111) and the geography image metadata (112)

At step 205, the geography based-KPI analysis system (100) generates the geography based-KPI analysis report comprising the KPI value for each KPI of the plurality of KPIs (110A-110N) supported by the geography based-KPI analysis system (100) for the geography.

At step 206, the geography based-KPI analysis system (100) stores the geography based-KPI analysis report for the geography in the geography based-KPI analysis report storage (105).

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 3:
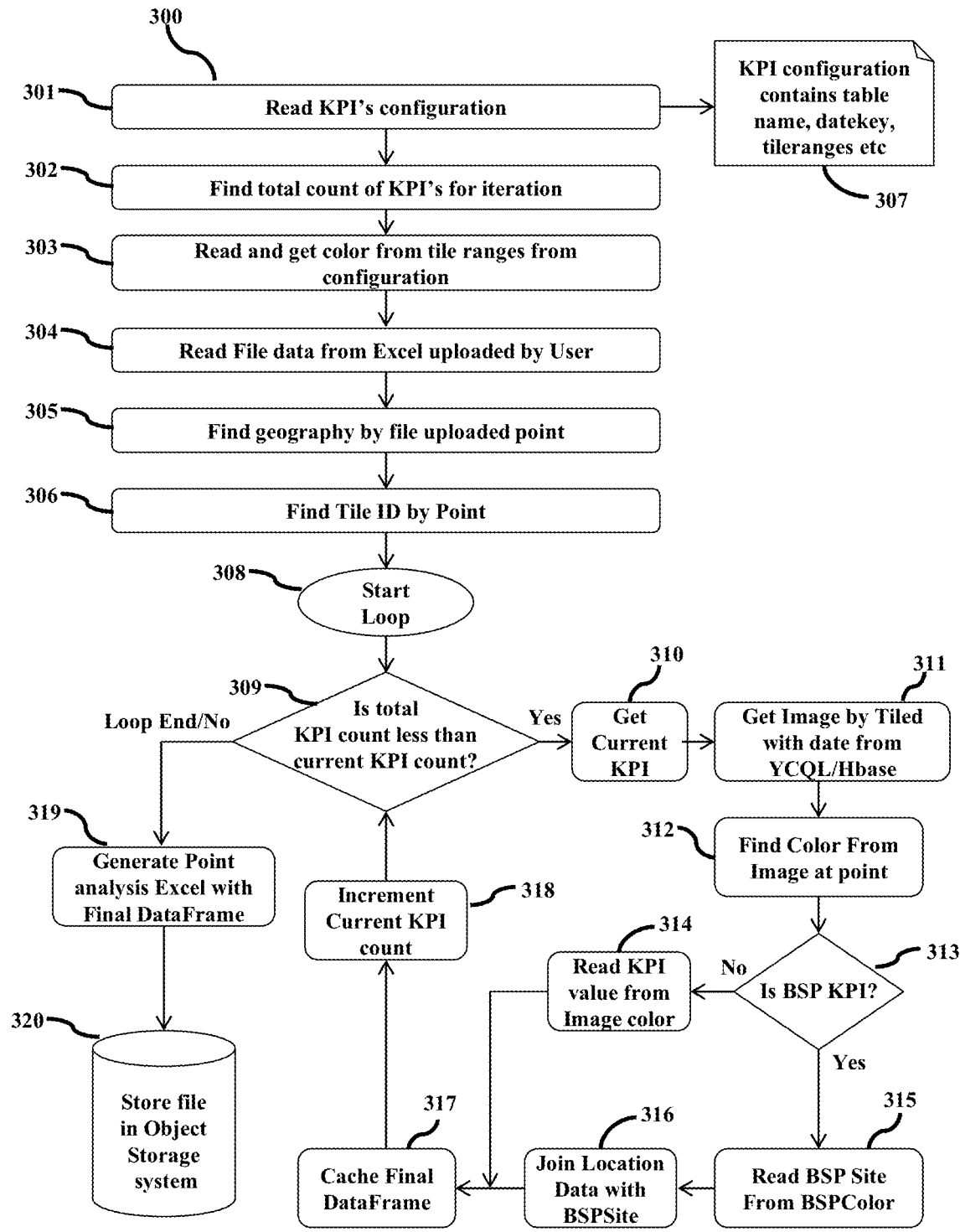
FIG. 3 is a flow chart illustrating a method for generating a geography based-KPI analysis report comprising the KPI value for each KPI of the plurality of KPIs, according to the embodiments as disclosed herein.

FIG. 3 is a flow chart (300) illustrating a method for generating the geography based-KPI analysis report comprising the KPI value for each KPI of the plurality of KPIs (110A-110N), according to the embodiments as disclosed herein.

At step 301, the geography based-KPI analysis system (100) reads the KPI configuration from the KPI database (109) (307), where the KPI database (109) (307) includes the plurality of KPIs (110A-110N) supported by the geography based-KPI analysis system (100). The KPI database (109) (307) further comprises the geography based-KPI color range (111), available in each geography image of the plurality of geography images (110AA-110NN) stored in the geography image database (107), for each KPI of the plurality of KPI. The KPI database (109) (307) comprises the geography image metadata (112) representing at least one of date and time of the geography image.

At step 302, the geography based-KPI analysis system (100) finds out the total count of the plurality of KPIs (110A-110N) supported by the geography based-KPI analysis system (100) for iteration.

At step 303, the geography based-KPI analysis system (100) determines geography based-KPI color range (111) available in each geography image of the plurality of geography images (110AA-110NN) stored in the geography image database (107).

At step 304, the geography based-KPI analysis system (100) displays the user interface to upload the data point file to the geography based-KPI analysis system (100). The data point file (e.g. excel sheet) comprises the latitude and longitude information of the geography for which the geography based-KPI analysis report need to be generated. The geography based-KPI analysis system (100) receives the data point file uploaded to the geography based-KPI analysis system (100) as the data point input.

At step 305, the geography based-KPI analysis system (100) determines the geography of the wireless network based on the latitude and longitude information.

At step 306, the geography based-KPI analysis system (100) determines the tile identifier based on the latitude and longitude information.

At step 308 and 309, the geography based-KPI analysis system (100) initiates a loop and determines whether the KPI count based on information about the plurality of KPIs (110A-110N), supported by the geography based-KPI analysis system (100) is lesser than a current KPI count of the plurality of KPIs (110A-110N) for processing e.g. The KPI count supported by the geography based-KPI analysis system (100) is 10, a first KPI count is 1, a second KPI count is 2, similar for a tenth KPI count is 10. The geography based-KPI analysis system (100) will stop the loop once the tenth KPI count is processed.

At step 310 and 311, the geography based-KPI analysis system (100) starts checking the current KPI and retrieve the geography image of the geography from the geography image database (107) based on the geography image metadata (112), the current KPI and the image identifier with a data from an YCQL or Hbase.

At step 312, the geography based-KPI analysis system (100) detects color provided in the retrieved geography image at the latitude and longitude information for each KPI of the plurality of KPIs (110A-110N) supported by the geography based-KPI analysis system (100).

At step 313, the geography based-KPI analysis system (100) determines whether the KPI is the BSP KPI.

At step 314, the geography based-KPI analysis system (100) determines the KPI value corresponding to the color code in the retrieved geography image when the KPI is not the BSP KPI.

At step 315 and 316, the geography based-KPI analysis system (100) determines the BSP color code corresponding to the color code in the retrieved geography image, and determine the KPI value corresponding to the BSP color code in the retrieved geography image when the KPI is the BSP KPI. In one embodiment, the geography based-KPI analysis system (100) determines the BSP site ID from the BSP color code and joins location data with BSP site ID.

At step 317, the geography based-KPI analysis system (100) generates the data frame based on the plurality of KPIs (110A-110N) supported by the geography based-KPI analysis system (100), the geography based-KPI color range (111) in the geography image of the determined geography, the KPI count, and the geography image metadata (112) representing date and time of the geography image.

At step 318, the geography based-KPI analysis system (100) iterates the process with the next KPI of a current KPI e.g. if the first KPI (count 1) is RSRP and the second KPI (count 2) is SINR, then the geography based-KPI analysis system (100) execute the steps 310-317 for the RSRP KPI, then at step 318, the geography based-KPI analysis system (100) starts to execute the SINR KPI. At step 318, the geography based-KPI analysis system (100) increases KPI count i.e. count 1 to count 2.

At step 309, the geography based-KPI analysis system (100) determines whether the count of the total KPI in the geography based-KPI analysis system (100) is lesser than the count of the current KPI e.g. if the total KPI count is 10 and the current KPI count is lesser then 10, then the step 310-318 will be executed. Else if the total KPI count is 10 and the current KPI count is not lesser than 10, then the geography based-KPI analysis system (100) ends the loop, and step 319 will be executed.

At step 319, the geography based-KPI analysis system (100) generates the geography based-KPI analysis report in a form of excel with the final dataframe. The geography based-KPI analysis report comprising the KPI value for each KPI of the plurality of KPIs (110A-110N) supported by the geography based-KPI analysis system (100) for the geography At step 320, the geography based-KPI analysis store the geography based-KPI analysis report for the geography in the geography based-KPI analysis report storage (105) e.g. object storage system.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 4:
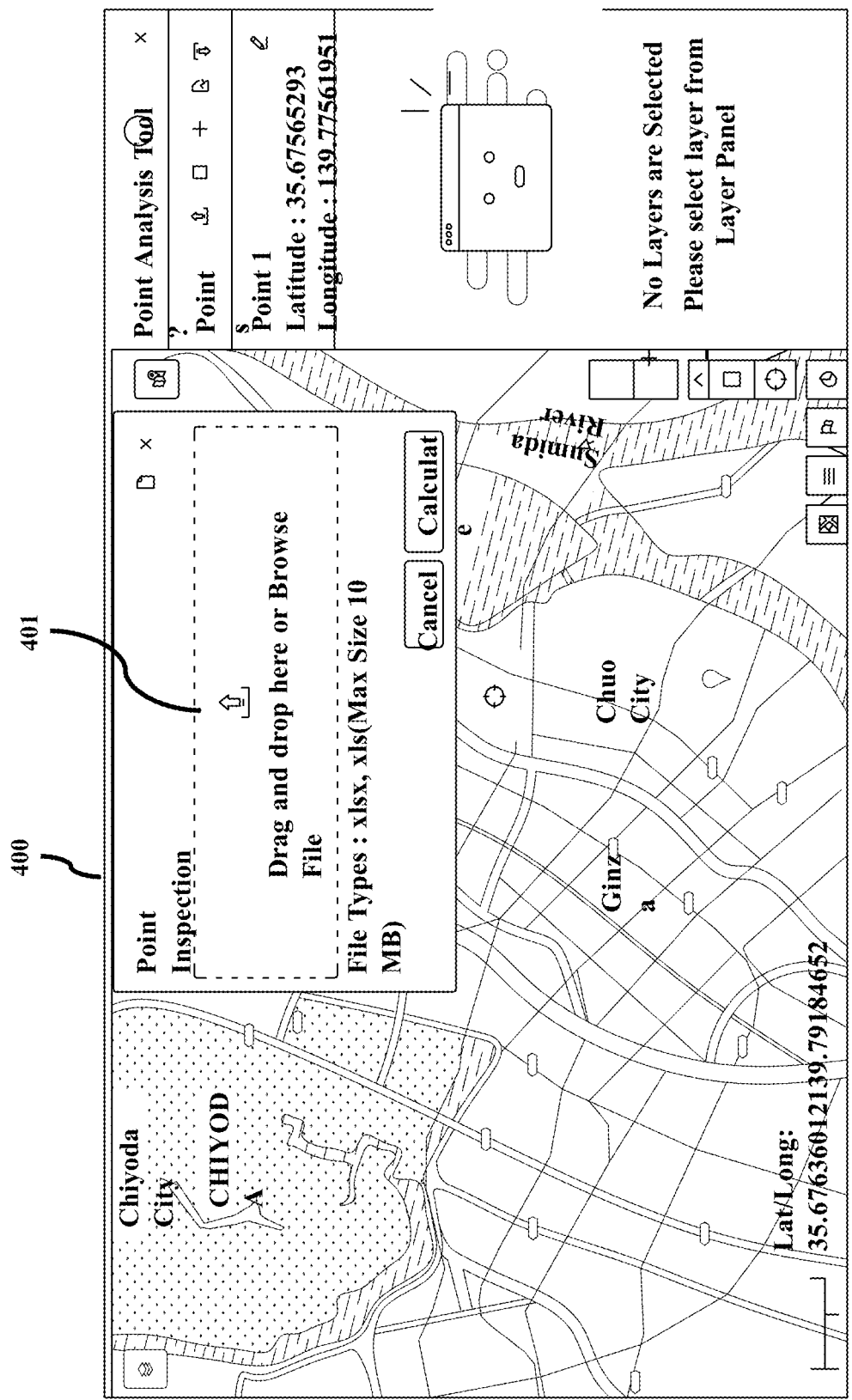
FIG. 4 is a schematic diagram illustrating uploading of a data point file for which the geography based-KPI analysis report need to be generated in an user interface of the geography based-KPI analysis system, according to the embodiments as disclosed herein.

FIG. 4 is a schematic diagram (400) illustrating uploading of the data point file for which the geography based-KPI analysis report need to be generated in a user interface of the geography based-KPI analysis system (100), according to the embodiments as disclosed herein.

The geography based-KPI analysis system (100) displays the user interface a setup box (401) to upload the data point file to the geography based-KPI analysis system (100). Some examples for datapoint file are excel or any related document. The user can drag and drop here or browse File using the setup box (401). The data point file comprises the latitude and longitude information of the determined geography for which the geography based-KPI analysis report need to be generated. The geography based-KPI analysis system (100) receives the data point file uploaded to the geography based-KPI analysis system (100) as the data point input. The geography based-KPI analysis system (100) extracts the latitude and longitude information of the determined geography for which the geography based-KPI analysis report needs to be generated from the uploaded datapoint file.

Figure 5:
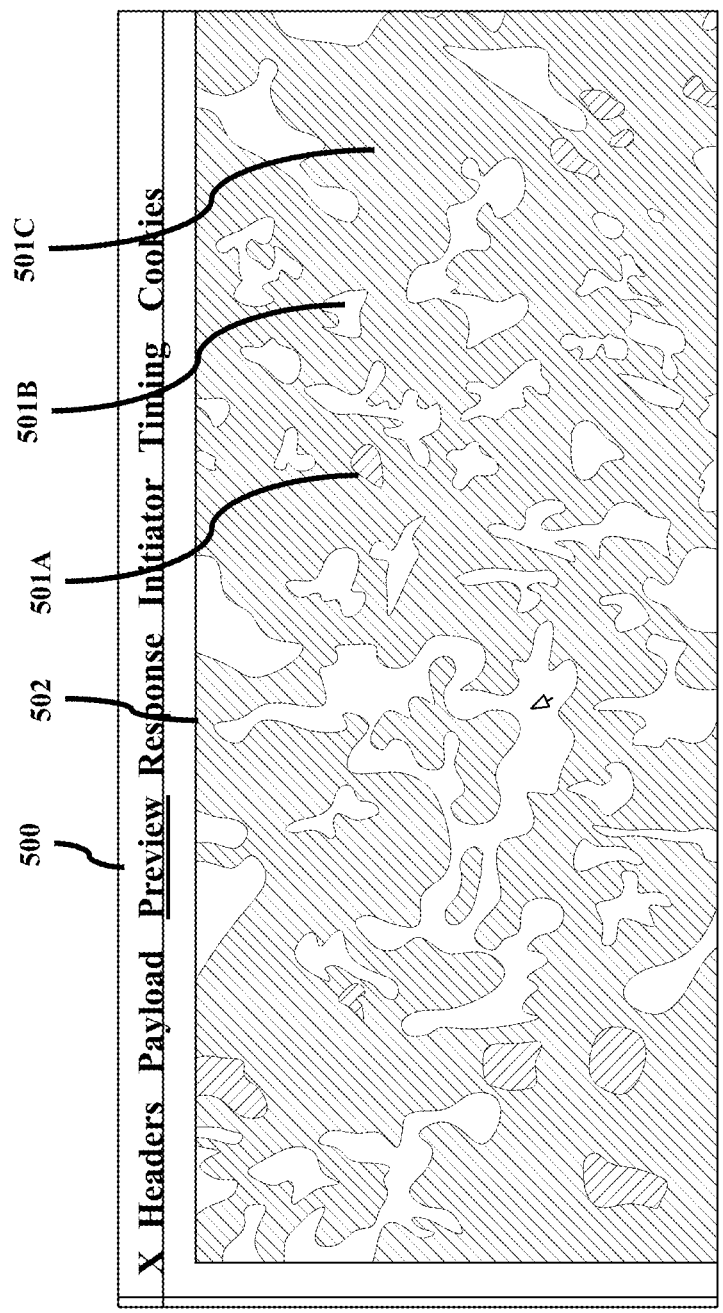
FIG. 5 is a schematic diagram illustrating a geography image of a geography from a geography image database in the user interface of the geography based-KPI analysis system, according to the embodiments as disclosed herein.

FIG. 5 is a schematic diagram (500) illustrating the geography image (502) of the geography from the geography image database in the user interface of the geography based-KPI analysis system (100), according to the embodiments as disclosed herein.

The geography based-KPI analysis system (100) for each KPI of the plurality of KPIs supported by the geography based-KPI analysis system (100), retrieves the geography image (502) from the plurality of geography images of the determined geography stored in the geography image database based on the image identifier and the geography image metadata.

The geography image (502) comprises different colors (501A-501C) within the color range configured for the KPI. Each color at the geography image (502) denotes specific signal parameters for the KPI.

The geography image (502) detects color provided in the retrieved geography image at the latitude and longitude information for each KPI of the plurality of KPIs supported by the geography based-KPI analysis system (100). The geography image (502) determines the geography based-KPI color range based on the set of pixels and detects the color at the latitude and longitude information based on the geography based-KPI color range.

The geography image (502) determines the color code corresponding to the detected color in the retrieved geography image based on the geography based-KPI color range and determine the KPI value corresponding to the color code in the retrieved geography image.

Figure 6:
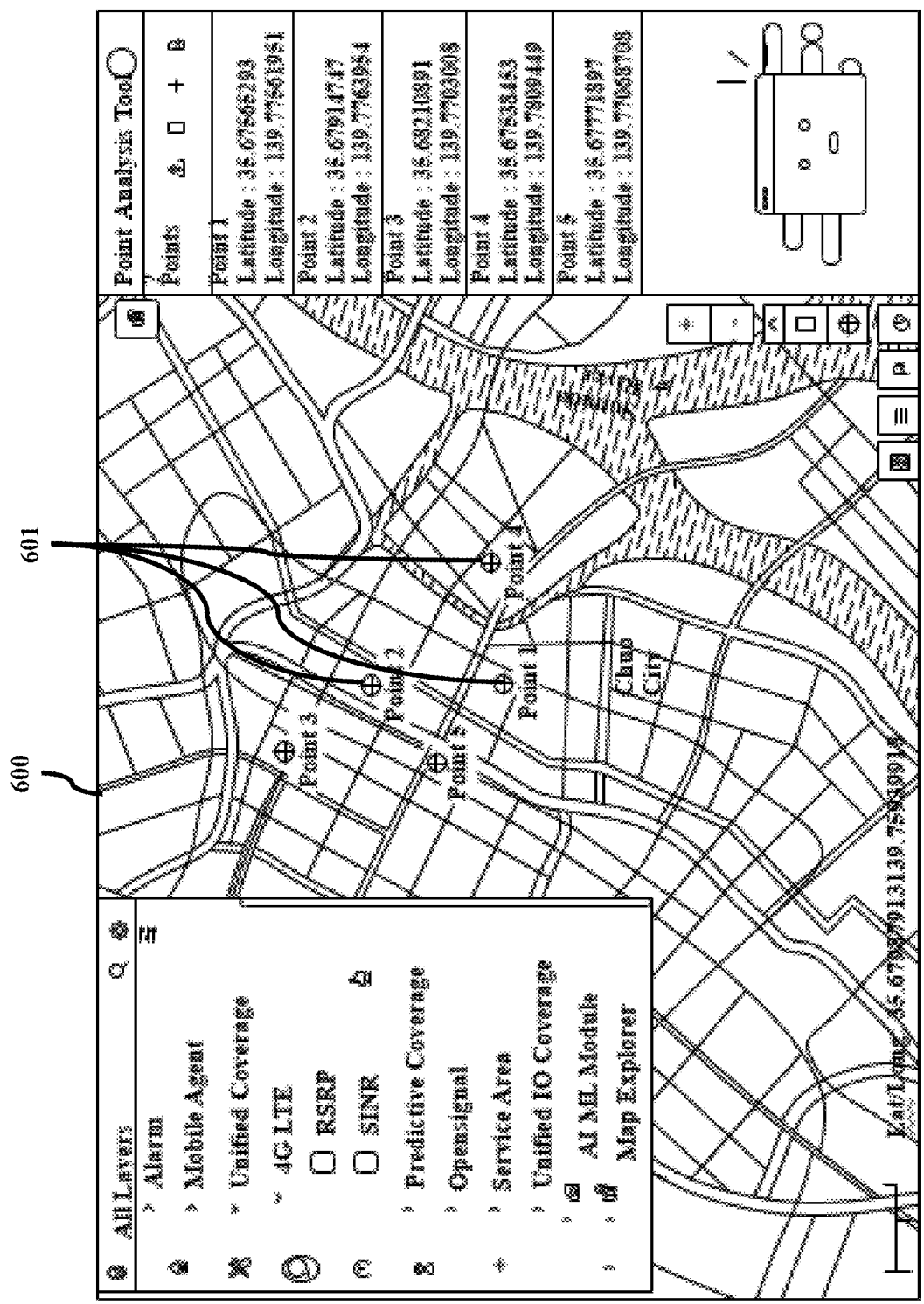
FIG. 6 is a schematic diagram illustrating a detection of the data point input from a user on the geographic map for which the geography based-KPI analysis report need to be generated in the user interface of the geography based-KPI analysis system, according to the embodiments as disclosed herein.

FIG. 6 is a schematic diagram (600) illustrating the detection of the data point inputs (601) from the user on the geographic map (600) for which the geography based-KPI analysis report needs to be generated in the user interface of the geography based-KPI analysis system (100), according to the embodiments as disclosed herein.

The geography based-KPI analysis system (100) displays the geographic map (600) to the user through the user interface of the geography based-KPI analysis system (100);

In an embodiment, the geography based-KPI analysis system (100) detects the data point inputs (601) from the user on the geographic map, where the data point input corresponds to the latitude and longitude information of the determined geography for which the geography based-KPI analysis report needs to be generated. Referring to the FIG. 6, the geography based-KPI analysis system (100) detects multiple data point inputs (601) such as point 1 to point 5 at a different location in the geographic map (600) for which the geography based-KPI analysis report needs to be generated.

Figure 7:
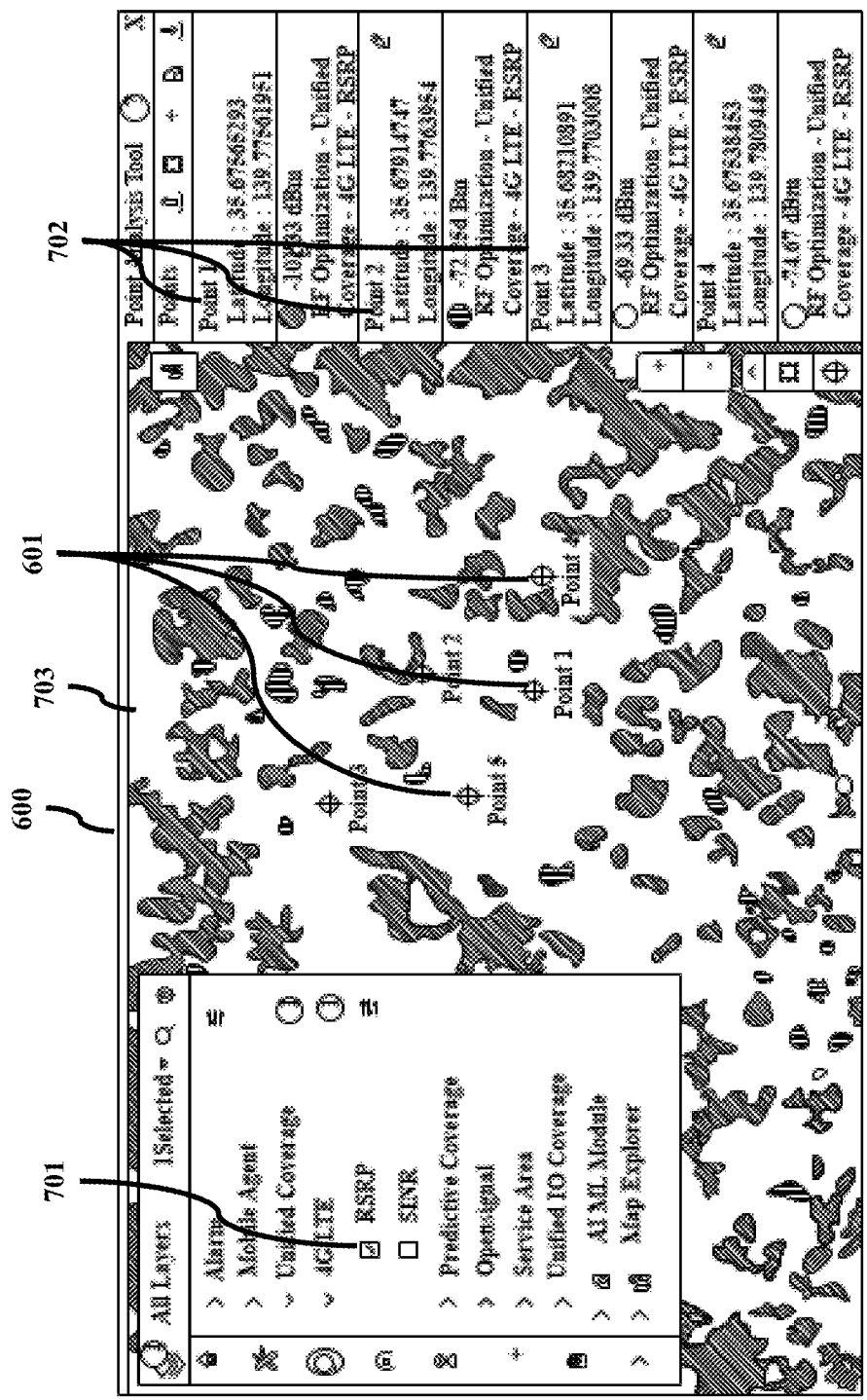
FIG. 7 is a schematic diagram illustrating KPI values and geography image for a Reference Signal Received Power (RSRP) KPI selected by the user in the user interface of the geography based-KPI analysis system, according to the embodiments as disclosed herein.

FIG. 7 is a schematic diagram illustrating KPI values and geography image for a RSRP KPI selected by the user in the user interface of the geography based-KPI analysis system (100), according to the embodiments as disclosed herein.

When the user wants to know the KPI value of the RSRP KPI at the different locations, the user needs to select the multiple datapoint in the different location such as the point 1 to the point 5. Further, when the user wants to know the KPI value of the RSRP KPI at the different locations, the user needs to select the RSRP option (701) in the user interface. When the user selects the RSRP option (701) in the user interface the geography based-KPI analysis system (100) determines the tile identifier based on the latitude and longitude information. Further the geography based-KPI analysis system (100) for the RSRP KPI retrieves the geography image (703) from the plurality of geography images stored in the geography image database based on the image identifier and the geography image metadata. Where the retrieved geography image (703) is iteratively retrieved based on the same tile identifier for the respective KPI (RSRP) of the plurality of KPIs.

The geography based-KPI analysis system (100) detects multiple data point inputs (601) such as point 1 to point 5 in the geographic map (600) for which the geography based-KPI analysis report needs to be identified. The geography based-KPI analysis system (100) detects color provided in the retrieved geography image (703) for the RSRP KPI for the different locations (601) such as the point 1 to the point 5.

The geography based-KPI analysis system (100) determines the color code corresponding to the detected color in the retrieved geography image (703) based on the geography based-KPI color range and determines the KPI value corresponding to the color code in the retrieved geography image. The geography based-KPI analysis system (100) displays the KPI values (702) of the RSRP KPI for the different locations (601) such as the point 1 to the point 5.

Figure 8:
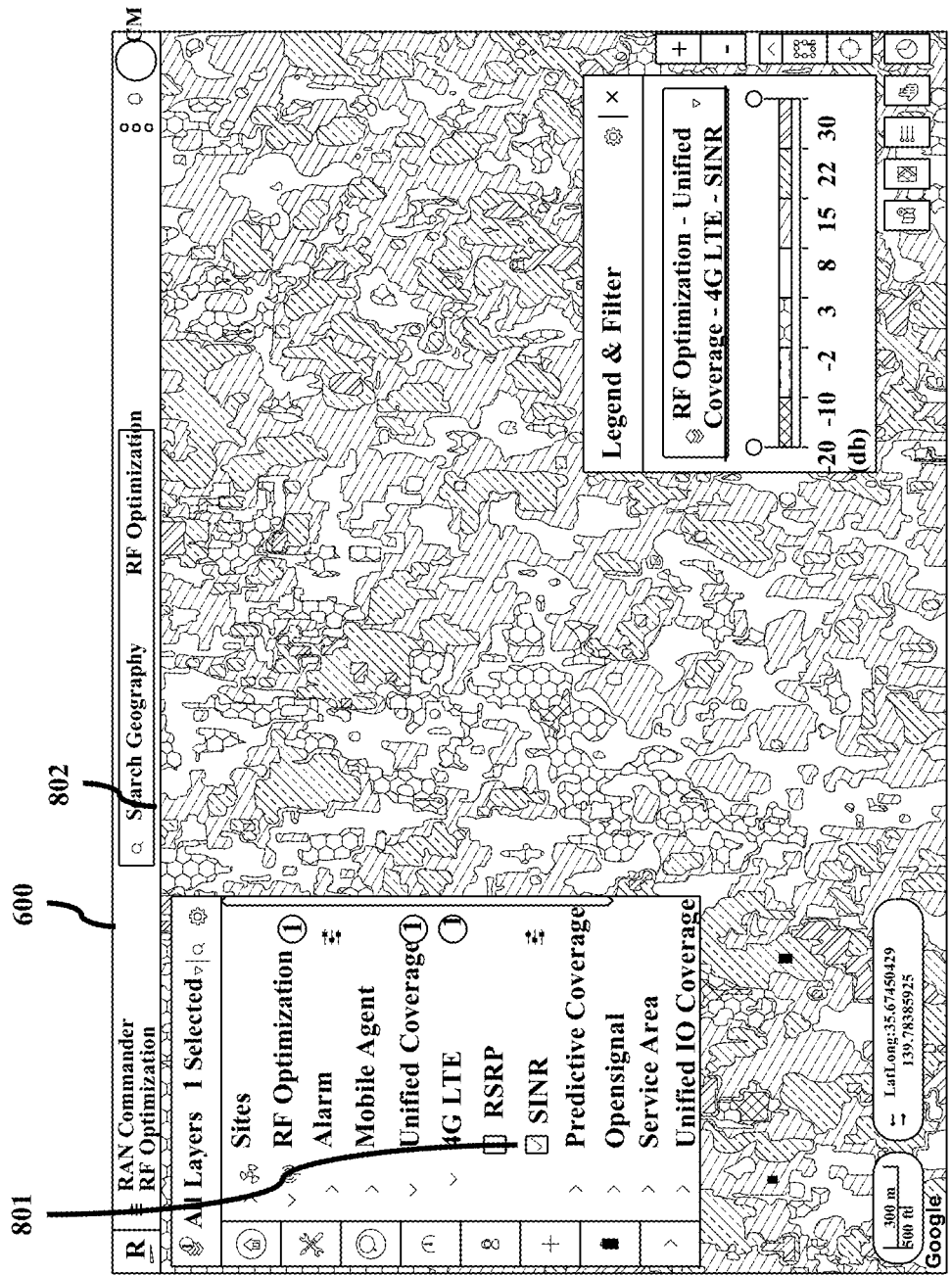
FIG. 8 is a schematic diagram illustrating geography image for a Signal Interference Noise Ratio (SINR) KPI selected by the user in the user interface of the geography based-KPI analysis system, according to the embodiments as disclosed herein.

FIG. 8 is a schematic diagram illustrating a geography image for a SINR KPI selected by the user in the user interface of the geography based-KPI analysis system (100), according to the embodiments as disclosed herein.

When the user wants to know the KPI value of the SINR KPI at the different locations, the user needs to select the SINR option (801) in the user interface. When the user selects the SINR option (801) in the user interface, the geography based-KPI analysis system (100) determines the tile identifier based on the latitude and longitude information. Further, the geography based-KPI analysis system (100) for the SINR KPI retrieves the geography image (802) from the plurality of geography images stored in the geography image database based on the image identifier and the geography image metadata. Where the retrieved geography image (802) is iteratively retrieved based on the same tile identifier for the SINR KPI.

The geography based-KPI analysis system (100) detects color provided in the retrieved geography image (802) for the SINR KPI for the different locations (601) such as the point 1 to the point 5. The geography based-KPI analysis system (100) determines the color code corresponding to the detected color in the retrieved geography image (802) based on the geography based-KPI color range and determines the KPI value corresponding to the color code in the retrieved geography image (802).

The proposed method and system have the following advantages:
1. The proposed system provides multiple KPIs Information of multiple points at a same time.
2. The proposed system reduces the analysis time, increases efficiency and processing speed.
3. The proposed system does not require enabling multiple time KPIs layers.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

We claim:
1. A geography based-Key Performance Indicator (KPI) analysis system of a wireless network, wherein the geography based-KPI analysis system comprises:
   a KPI database that stores a system configuration comprising:
      a plurality of KPIs supported by the geography based-KPI analysis system,
      a geography based-KPI color range available in a geography image for each KPI of the plurality of KPI, and
      a geography image metadata representing at least one of date and time of the geography image; and
   a processor connected to the KPI database, wherein the processor is configured to:
      receive a data point input comprising latitude and longitude information for which a geography based-KPI analysis report is to be generated;
      determine the geography of the wireless network based on the latitude and longitude information;
      for each KPI of the plurality of KPIs supported by the geography based-KPI analysis system for the geography, iteratively determine a KPI value based on the geography based-KPI color range and the geography image metadata, the KPI value determined by identifying a color at the data point in the geography image for a corresponding KPI, from among a plurality of geography images respectively corresponding to the plurality of KPIs, and determining the KPI value corresponding to the identified color;
      generate the geography based-KPI analysis report comprising the KPI value for each KPI of the plurality of KPIs supported by the geography based-KPI analysis system for the geography; and
      store the geography based-KPI analysis report for the geography in a geography based-KPI analysis report storage.

2. The geography based-KPI analysis system as claimed in claim 1, wherein to iteratively determine the KPI value based on the geography based-KPI color range and the geography image metadata, the processor is configured to:
   determine an image identifier based on the latitude and longitude information; and
   for each KPI of the plurality of KPIs supported by the geography based-KPI analysis system, retrieve the geography image from a plurality of geography images of the determined geography stored in a geography image database based on the image identifier and the geography image metadata;

for each KPI of the plurality of KPIs supported by the geography based-KPI analysis system, detect color provided in the retrieved geography image at the latitude and longitude information;

for each KPI of the plurality of KPIs supported by the geography based-KPI analysis system, determine a color code corresponding to the detected color in the retrieved geography image based on the geography based-KPI color range; and for each KPI of the plurality of KPIs supported by the geography based-KPI analysis system, determine the KPI value corresponding to the color code in the retrieved geography image.

3. The geography based-KPI analysis system as claimed in claim 2, wherein to determine the KPI value corresponding to the color code in the retrieved geography image, the processor is configured to:

for each KPI of the plurality of KPIs supported by the geography based-KPI analysis system, determine whether the KPI is a Best Server Plot (BSP) KPI; and for each KPI of the plurality of KPIs supported by the geography based-KPI analysis system, perform one of:
when the KPI is the BSP KPI, determine a BSP color code corresponding to the color code in the retrieved geography image, and determine the KPI value corresponding to the BSP color code in the retrieved geography image, and
when the KPI is not the BSP KPI, determine the KPI value corresponding to the color code in the retrieved geography image.

4. The geography based-KPI analysis system as claimed in claim 2, wherein to detect the color provided in the retrieved geography image at the latitude and longitude information, the processor is configured to:

segment the retrieved image into a plurality of pixels;
retrieve a set of pixels from the plurality of pixels at the latitude and longitude information;
determine the geography based-KPI color range based on the set of pixels; and
detect the color at the latitude and longitude information based on the geography based-KPI color range.

5. The geography based-KPI analysis system as claimed in claim 2, wherein the geography image database stores the plurality of geography images of the determined geography using the same tile identifier, and wherein each geography image of the plurality of geography images is associated with respective KPI of the plurality of KPIs supported by the geography based-KPI analysis system, and wherein each geography image of the plurality of geography images comprises color regions representing the KPI value of the respective KPI of the plurality of KPIs supported by the geography based-KPI analysis system.

6. The geography based-KPI analysis system as claimed in claim 2, wherein the geography images of the determined geography stored in the geography image database is iteratively retrieved based on the same tile identifier for respective KPI of the plurality of KPIs.

7. The geography based-KPI analysis system as claimed in claim 1, wherein to generate the geography based-KPI analysis report comprising the KPI value for each KPI of the plurality of KPIs supported by the geography based-KPI analysis system, the processor is configured to:

retrieve the system configuration from the KPI database;
determine a KPI count based on information about the plurality of KPIs, supported by the geography based-KPI analysis system, provided in the system configuration;
generate a data frame based on the plurality of KPIs supported by the geography based-KPI analysis system, the geography based-KPI color range in the geography image of the determined geography, the KPI count, and the geography image metadata representing at least one of date and time of the geography image;
determine whether the KPI value for each KPI of the plurality of KPIs are received based on the KPI count; and
generate the geography based-KPI analysis report by appending the KPI value for each KPI of the plurality of KPIs to the data frame when the KPI value for each KPI of the plurality of KPIs are received based on the KPI count.

8. The geography based-KPI analysis system as claimed in claim 1, wherein to receive the data point input comprising latitude and longitude information, the processor is configured to:

display a user interface to upload a data point file to the geography based-KPI analysis system, wherein the data point file comprises the latitude and longitude information of the determined geography for which the geography based-KPI analysis report is to be generated;
receive the data point file uploaded to the geography based-KPI analysis system as the data point input; and
extract the latitude and longitude information of the determined geography for which the geography based-KPI analysis report is to be generated from the uploaded datapoint file.

9. The geography based-KPI analysis system as claimed in claim 1, wherein to receive a data point input comprising latitude and longitude information, the processor is configured to:

display a geographic map to a user; and
detect the data point input from the user on the geographic map, wherein the data point input corresponds to the latitude and longitude information of the determined geography for which the geography based-KPI analysis report is to be generated.

10. A method for geography based-KPI analysis of a wireless network by a geography based-KPI analysis system, comprises:

storing, by the geography based-KPI analysis system, at a KPI database a system configuration comprising a plurality of KPIs supported by the geography based-KPI analysis system, a geography based-KPI color range available in a geography image for each KPI of the plurality of KPI, and a geography image metadata representing at least one of date and time of the geography image;
receiving, by the geography based-KPI analysis system, a data point input comprising latitude and longitude information for which a geography based-KPI analysis report is to be generated;
determining, by the geography based-KPI analysis system, the geography of the wireless network based on the latitude and longitude information;
for each KPI of the plurality of KPIs supported by the geography based-KPI analysis system for the geography, iteratively determining, by the geography based-KPI analysis system, a KPI value based on the geography based-KPI color range and the geography image metadata, the KPI value determined by identifying a color at the data point in the geography image for a corresponding KPI, from among a plurality of geography images respectively corresponding to the plurality of KPIs, and determining the KPI value corresponding to the identified color;

generating, by the geography based-KPI analysis system, the geography based-KPI analysis report comprising the KPI value for each KPI of the plurality of KPIs supported by the geography based-KPI analysis system for the geography; and storing, by the geography based-KPI analysis system, the geography based-KPI analysis report for the geography in a geography based-KPI analysis report storage.

11. The method as claimed in claim 10, wherein determining, by the geography based-KPI analysis system, the KPI value based on the geography based-KPI color range and the geography image metadata comprises:

determining, by the geography based-KPI analysis system, an image identifier based on the latitude and longitude information; and for each KPI of the plurality of KPIs supported by the geography based-KPI analysis system, retrieving, by the geography based-KPI analysis system, the geography image from a plurality of geography images of the determined geography stored in a geography image database based on the image identifier and the geography image metadata;

for each KPI of the plurality of KPIs supported by the geography based-KPI analysis system, detecting, by the geography based-KPI analysis system, color provided in the retrieved geography image at the latitude and longitude information;

for each KPI of the plurality of KPIs supported by the geography based-KPI analysis system, determining, by the geography based-KPI analysis system, a color code corresponding to the detected color in the retrieved geography image based on the geography based-KPI color range; and for each KPI of the plurality of KPIs supported by the geography based-KPI analysis system, determining, by the geography based-KPI analysis system, the KPI value corresponding to the color code in the retrieved geography image.

12. The method as claimed in claim 11, wherein determining, by the geography based-KPI analysis system, the KPI value corresponding to the color code in the retrieved geography image comprises:

for each KPI of the plurality of KPIs supported by the geography based-KPI analysis system, determining, by the geography based-KPI analysis system, whether the KPI is a Best Server Plot (BSP) KPI; and for each KPI of the plurality of KPIs supported by the geography based-KPI analysis system, performing, by the geography based-KPI analysis system, one of:

when the KPI is the BSP KPI, determining a BSP color code corresponding to the color code in the retrieved geography image, and determining the KPI value corresponding to the BSP color code in the retrieved geography image, and when the KPI is not the BSP KPI, determining, by the geography based-KPI analysis system, the KPI value corresponding to the color code in the retrieved geography image.

13. The method as claimed in claim 11, wherein detecting, by the geography based-KPI analysis system, the color provided in the retrieved geography image at the latitude and longitude information comprises:

segmenting, by the geography based-KPI analysis system, the retrieved image into a plurality of pixels;

retrieving, by the geography based-KPI analysis system, a set of pixels from the plurality of pixels at the latitude and longitude information;

determining, by the geography based-KPI analysis system, the geography based-KPI color range based on the set of pixels; and detecting, by the geography based-KPI analysis system, the color at the latitude and longitude information based on the geography based-KPI color range.

14. The method as claimed in claim 11, wherein the geography image database stores the plurality of geography images of the determined geography using the same tile identifier, and wherein each geography image of the plurality of geography images is associated with respective KPI of the plurality of KPIs supported by the geography based-KPI analysis system, and wherein each geography image of the plurality of geography images comprises color regions representing the KPI value of the respective KPI of the plurality of KPIs supported by the geography based-KPI analysis system.

15. The method as claimed in claim 11, wherein the geography images of the determined geography stored in the geography image database is iteratively retrieved based on the same tile identifier for respective KPI of the plurality of KPIs.

16. The method as claimed in claim 10, wherein generating, by the geography based-KPI analysis system, the geography based-KPI analysis report comprising the KPI value for each KPI of the plurality of KPIs supported by the geography based-KPI analysis system comprises:

retrieving, by the geography based-KPI analysis system, the system configuration from the KPI database;

determining, by the geography based-KPI analysis system, a KPI count based on information about the plurality of KPIs, supported by the geography based-KPI analysis system, provided in the system configuration;

generating, by the geography based-KPI analysis system, a data frame based on the plurality of KPIs supported by the geography based-KPI analysis system, the geography based-KPI color range in the geography image of the determined geography, the KPI count, and the geography image metadata representing at least one of date and time of the geography image;

determining, by the geography based-KPI analysis system, whether the KPI value for each KPI of the plurality of KPIs are received based on the KPI count; and generating, by the geography based-KPI analysis system, the geography based-KPI analysis report by appending the KPI value for each KPI of the plurality of KPIs to the data frame when the KPI value for each KPI of the plurality of KPIs are received based on the KPI count.

17. The method as claimed in claim 10, wherein receiving, by the geography based-KPI analysis system, the data point input comprising latitude and longitude information comprises:

displaying, by the geography based-KPI analysis system, a user interface to upload a data point file to the geography based-KPI analysis system, wherein the data point file comprises the latitude and longitude information of the determined geography for which the geography based-KPI analysis report is to be generated;

receiving, by the geography based-KPI analysis system, the data point file uploaded to the geography based-KPI analysis system as the data point input; and extracting, by the geography based-KPI analysis system, the extract the latitude and longitude information of the determined geography for which the geography based-KPI analysis report is to be generated from the uploaded datapoint file.

18. The method as claimed in claim 10, wherein receiving, by the geography based-KPI analysis system, a data point input comprising latitude and longitude information comprises:

displaying, by the geography based-KPI analysis system, a geographic map to a user; and detecting, by the geography based-KPI analysis system, the data point input from the user on the geographic map, wherein the data point input corresponds to the latitude and longitude information of the determined geography for which the geography based-KPI analysis report is to be generated.

* * * * *